United States Patent
Oonishi et al.

(10) Patent No.: US 9,524,091 B2
(45) Date of Patent: Dec. 20, 2016

(54) DEVICE, METHOD, AND STORAGE MEDIUM STORING PROGRAM

(71) Applicant: KYOCERA CORPORATION, Kyoto-shi, Kyoto (JP)

(72) Inventors: Katsuaki Oonishi, Tokyo (JP); Sanae Nishio, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 31 days.

(21) Appl. No.: 13/721,401

(22) Filed: Dec. 20, 2012

(65) Prior Publication Data

US 2013/0167074 A1 Jun. 27, 2013

(30) Foreign Application Priority Data

Dec. 22, 2011 (JP) ................. 2011-281124

(51) Int. Cl.
| | |
|---|---|
| G06F 3/0484 | (2013.01) |
| G06F 3/0488 | (2013.01) |
| G06F 21/36 | (2013.01) |
| H04M 1/67 | (2006.01) |
| G06F 3/0481 | (2013.01) |

(52) U.S. Cl.
CPC ......... *G06F 3/04847* (2013.01); *G06F 3/0488* (2013.01); *G06F 3/04883* (2013.01); *G06F 21/36* (2013.01); *H04M 1/67* (2013.01); *G06F 3/04817* (2013.01); *H04M 2250/22* (2013.01)

(58) Field of Classification Search
CPC ...... G06F 3/048; G06F 3/0481; G06F 9/4443; G06F 3/04817; G06F 3/04847; G06F 21/36

USPC ................. 715/863, 864, 847, 799
See application file for complete search history.

(56) References Cited

U.S. PATENT DOCUMENTS

| | | | |
|---|---|---|---|
| 2008/0165160 A1 | 7/2008 | Kocienda et al. | |
| 2010/0333197 A1 | 12/2010 | Wang | |
| 2012/0069231 A1* | 3/2012 | Chao | 348/333.01 |
| 2014/0229884 A1 | 8/2014 | Shimazaki | |

FOREIGN PATENT DOCUMENTS

| | | |
|---|---|---|
| JP | 2009-211533 A | 9/2009 |
| WO | 2008086302 A1 | 7/2008 |
| WO | 2013/035744 A1 | 3/2013 |

OTHER PUBLICATIONS

Dro.IO, "Rotate Screen Unlock—Android Apps on Google Play", Sep. 3, 2009, [retrieved from the Internet on Mar. 18, 2015], <URL: https://play.google.com/store/apps/details?id=com.lefutura.rotateunlock/>, p. 1-2.*

(Continued)

*Primary Examiner* — Ajay Bhatia
*Assistant Examiner* — Mong-Shune Chung
(74) *Attorney, Agent, or Firm* — Hauptman Ham, LLP

(57) ABSTRACT

According to an aspect, a device includes a touch screen display and a controller. The touch screen display displays a first screen. The first screen is a lock screen including an object arranged thereon. The controller changes a direction of the object according to an operation to the object. The controller is configured to turn the first screen to a second screen depending on a content of the operation made to the object. The second screen being a screen other than the lock screen.

9 Claims, 13 Drawing Sheets

(56) References Cited

OTHER PUBLICATIONS

Cache, "Touch-Click Mode Tutorial", Jan. 3, 2011, [retrieved from the Internet on Aug. 19, 2015], <URL: https://www.cacheideas.com/tutorial/tutorialtouchclick.html/>, p. 1-12.*

Office Action mailed Feb. 3, 2015, corresponding to Japanese patent application No. 2011-281124, for which an explanation of relevance is attached.

* cited by examiner

FIG.10

| UNLOCK CONDITION SETTING SCREEN ||
|---|---|
| POSITION OF NUMBER DESCRIBED ON BEZEL ||
| TOUCH POSITION | RELEASE POSITION |
| 20 | 40 |

FIG.12

| CANCELLATION SETTING SCREEN |||
|---|---|---|
| UNLOCK CONDITION |||
| ROTATION DIRECTION OF BEZEL | POSITION OF NUMBER DESCRIBED ON BEZEL ||
| CLOCKWISE | TOUCH POSITION | RELEASE POSITION |
| | 20 | 40 |
| SECRET UNLOCK CONDITION |||
| ROTATION DIRECTION OF BEZEL | POSITION OF NUMBER DESCRIBED ON BEZEL ||
| ANTICLOCKWISE | TOUCH POSITION | RELEASE POSITION |
| | 55 | 35 |

DEVICE, METHOD, AND STORAGE MEDIUM STORING PROGRAM

CROSS-REFERENCE TO RELATED APPLICATIONS

This application claims priority from Japanese Application No. 2011-281124, filed on Dec. 22, 2011, the content of which is incorporated by reference herein in its entirety.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Most of the touch screen devices can display a screen called as lock screen on the display in terms of prevention of an incorrect operation by the user and security. Under the locked state where the lock screen is displayed, the touch screen device does not accept any operation except some particular operations until an unlock operation is accepted.

By the way, upon detecting the unlock operation on the lock screen, the touch screen device turns the lock screen to a predetermined screen to recover itself to a state where the user can make operations thereon. However, since the unlock operation is an easy operation, everyone can do it. As a result, there is a problem that the security capability of the lock screen is not always high enough.

For such the reason, there is a need for a device, a method, and a program that can improve the security capability of the lock screen.

SUMMARY

According to an aspect, a device includes a touch screen display and a controller. The touch screen display displays a first screen. The first screen is a lock screen including an object arranged thereon. The controller changes a direction of the object according to an operation to the object. The controller is configured to turn the first screen to a second screen depending on a content of the operation made to the object. The second screen being a screen other than the lock screen According to another aspect, a method is for controlling a device including a touch screen display. The method includes: displaying on the touch screen display a first screen, the first screen being a lock screen including an object arranged thereon; changing a direction of the object according to an operation to the object; and turning the first screen to a second screen depending on a content of the operation made to the object, the second screen being a screen other than the lock screen.

According to another aspect, a non-transitory storage medium stores a program. When executed by a device comprising a touch screen display, the program causes the device to execute: displaying on the touch screen display a first screen, the first screen being a lock screen including an object arranged thereon; changing a direction of the object according to an operation to the object; and turning the first screen to a second screen depending on a content of the operation made to the object, the second screen being a screen other than the lock screen.

BRIEF DESCRIPTION OF THE DRAWINGS

FIG. 10 is a view illustrating an example of a setting screen of the unlock condition used in the procedure illustrated in FIG. 9;

FIG. 12 is a view illustrating an example of a setting screen of the unlock condition used in the procedure illustrated in FIG. 11;

DETAILED DESCRIPTION

Exemplary embodiments of the present invention will be explained in detail below with reference to the accompanying drawings. A smartphone will be explained below as an example of a device including a touch screen.

Figure 1:
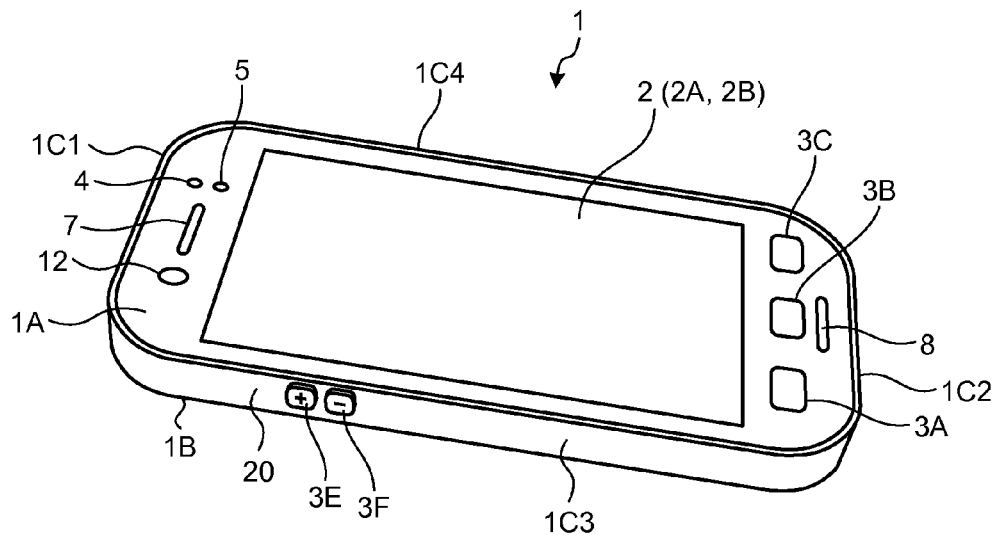
FIG. 1 is a perspective view of a smartphone according to an embodiment.
Figure 2:
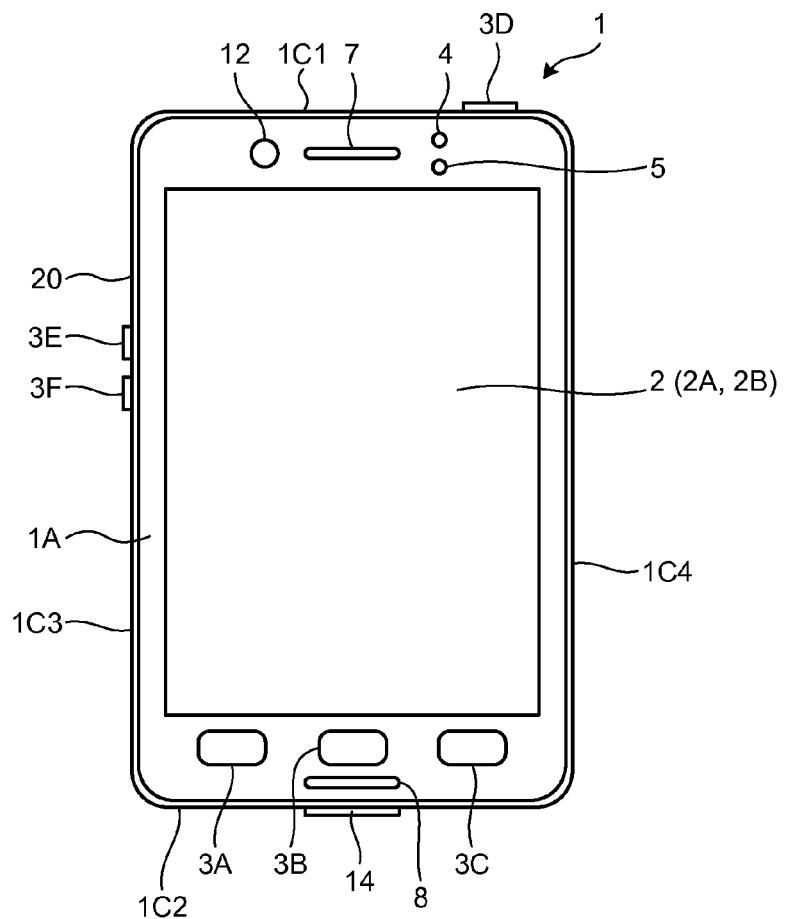
FIG. 2 is a front view of the smartphone.
Figure 3:
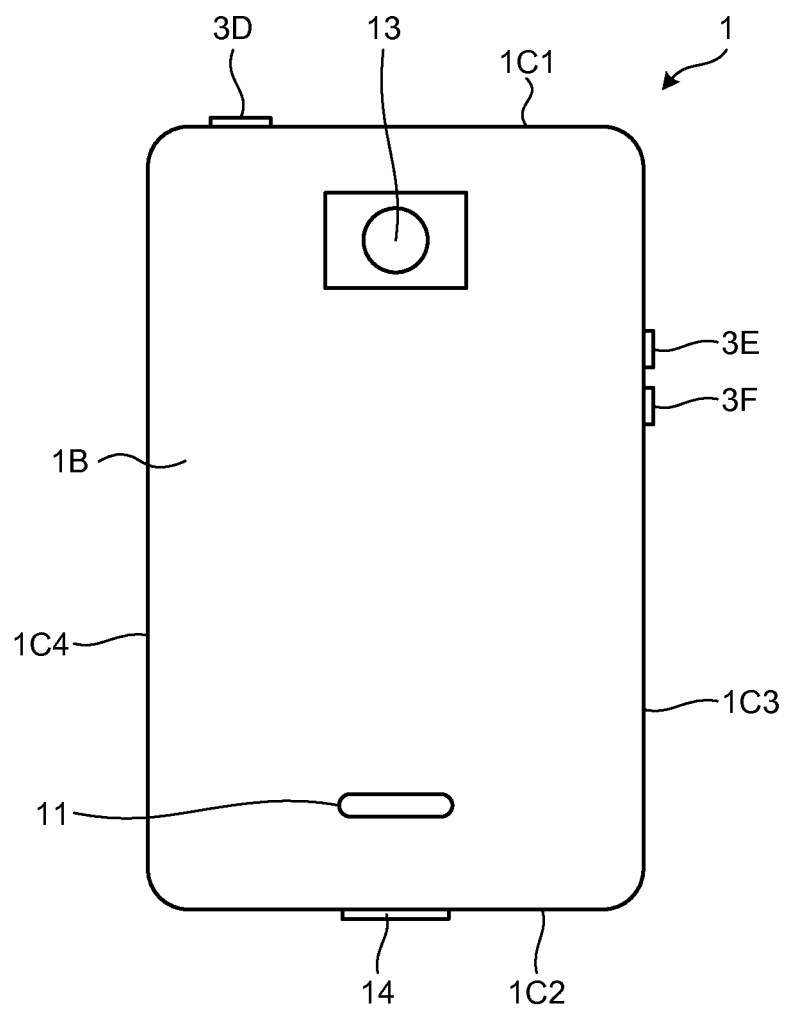
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s)

and then the smartphone determines the type of the gesture as X based on the contact(s) may be simply described as "the smartphone detects X" or "the controller detects X".

Figure 4:
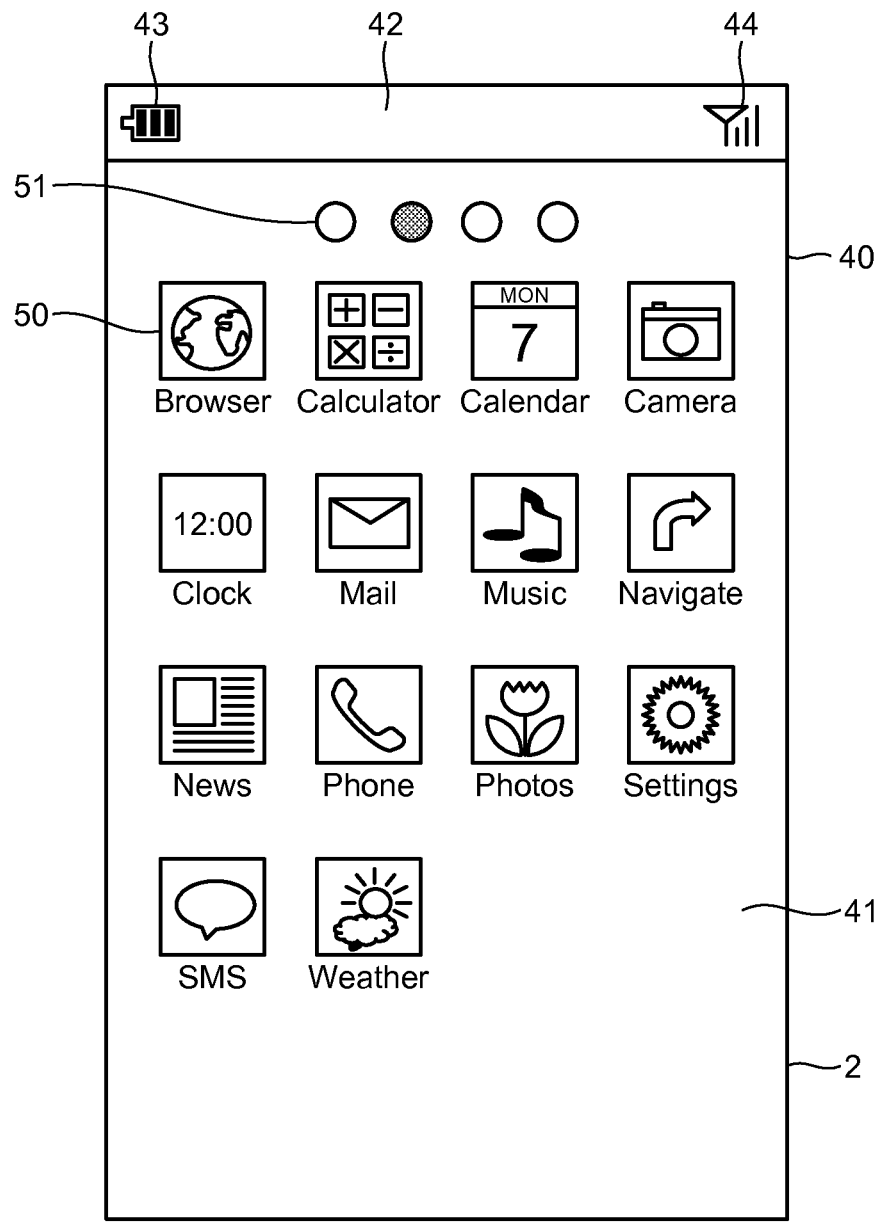
FIG. 4 is a view illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A. A lock screen is also displayed on the display 2A as well as the home screen 40 illustrated in FIG. 4. The lock screen is configured not to accept any operation except a predetermined unlock operation in terms of prevention of an incorrect operation by the user and security. For example, when a predetermined time period is elapsed before any operation is detected during display of the home screen 40, the smartphone 1 may display the lock screen on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even when there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
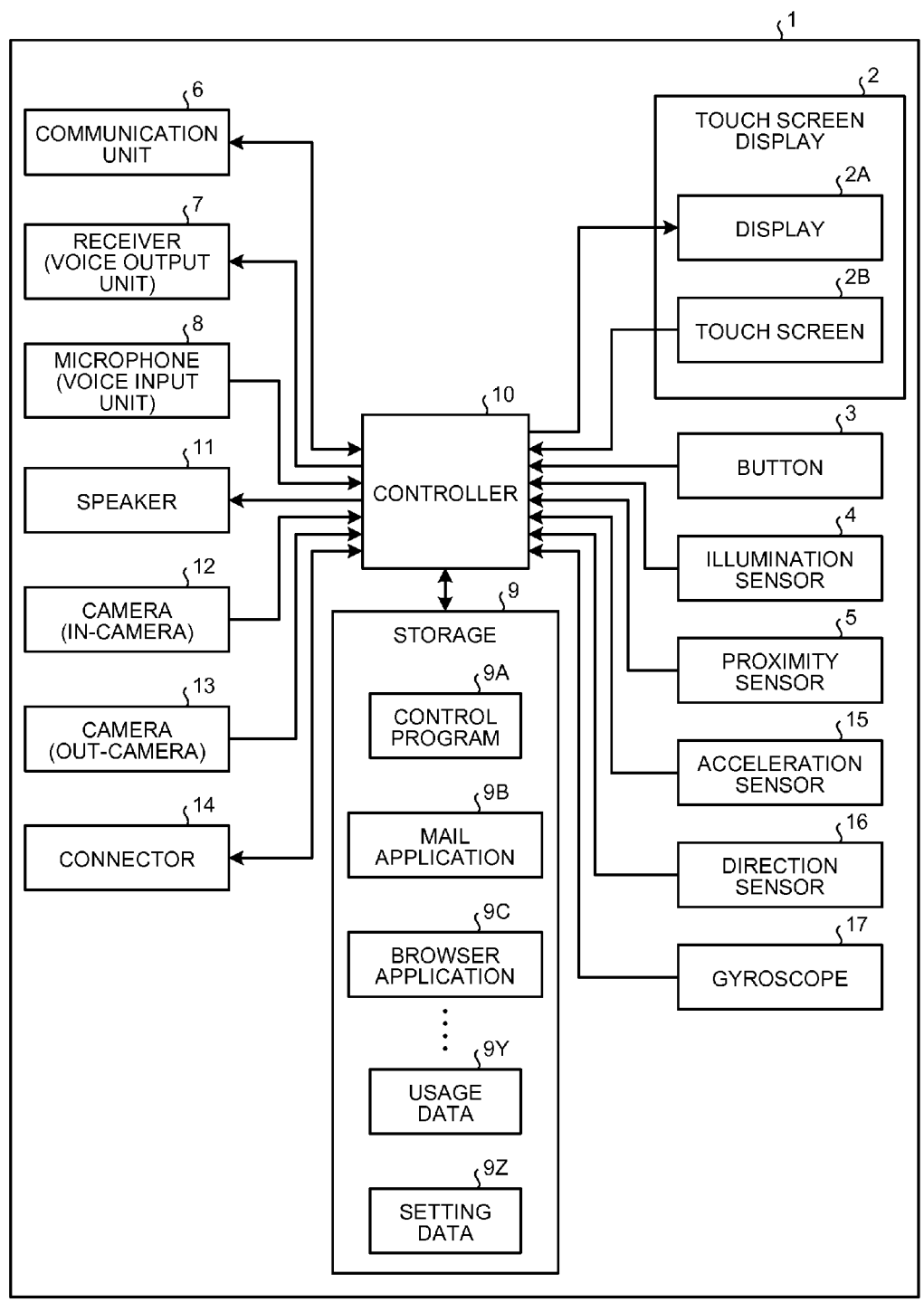
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores a control program 9A, a mail application 9B, a browser application 9C, usage data 9Y, and setting data 9Z, for example. The mail application 9B provides an e-mail function. The e-mail function allows for composition, transmission, reception, and display of the e-mail, for example. The browser application 9C provides the WEB browsing function. The WEB browsing function allows for the display of the WEB page, the edition of the bookmark, and so on. The usage data 9Y includes information on the usage of the application installed in the smartphone 1. For example, the usage data 9Y has the items for a screen, a row, a line, an image, a name, the install date and time, the number of use, the date and time of the last use, and so on, and holds the data on an application basis installed in the smartphone 1. The setting data 9Z includes information of various setting for the operation of the smartphone 1 and an unlock condition for cancelling the locked state. The storage 9 stores information of the unlock condition for cancelling the locked state. The unlock condition will be described later.

The control program 9A provides functions for various control for causing the smartphone 1 to run. The control program 9A implements call communication by controlling, for example, the communication unit 6, the receiver 7, and the microphone 8. The functions provided by the control program 9A include the control function that causes the direction of the object to change according to the operation made to the object while keeping the display position thereof on the lock screen displayed on the display 2A. The function provided by the control program 9A may be utilized in combination with the function provided by other programs such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to thereby detect an operation made to an object on the lock screen through the touch screen 2B and rotate the object according to the detection result while keeping the display position of the object thereon. The controller 10 cancels the locked state in response to an operation to the object on the lock screen to display the home screen 40 or the like on the display 2A.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

By referring to FIG. 6, FIG. 7, and FIG. 8, described below will be the example of the control based on the function provided by the control program 9A. The functions provided by the control program 9A include the function of detecting an operation made to an object on the lock screen 60 and rotating the object according to the detection result and the function of cancelling the locked state according to the operation made to the object. Rotating the object includes moving the object without changing the display position thereof, and changing the direction of the object without changing the display position thereof. Specifically, based on the function provided by the control program 9A, the smartphone 1 rotates the object while keeping the display position thereof according to the user operation made to the object displayed on the lock screen 60. Keeping the display position of the object includes keeping substantially the same position that is occupied by the object in the lock screen 60 regardless of the movement of the object or the rotation of the object. The smartphone 1 cancels the locked state depending on the operation made to the object and displays the home screen 40 as illustrated in FIG. 4, for example.

Figure 6:
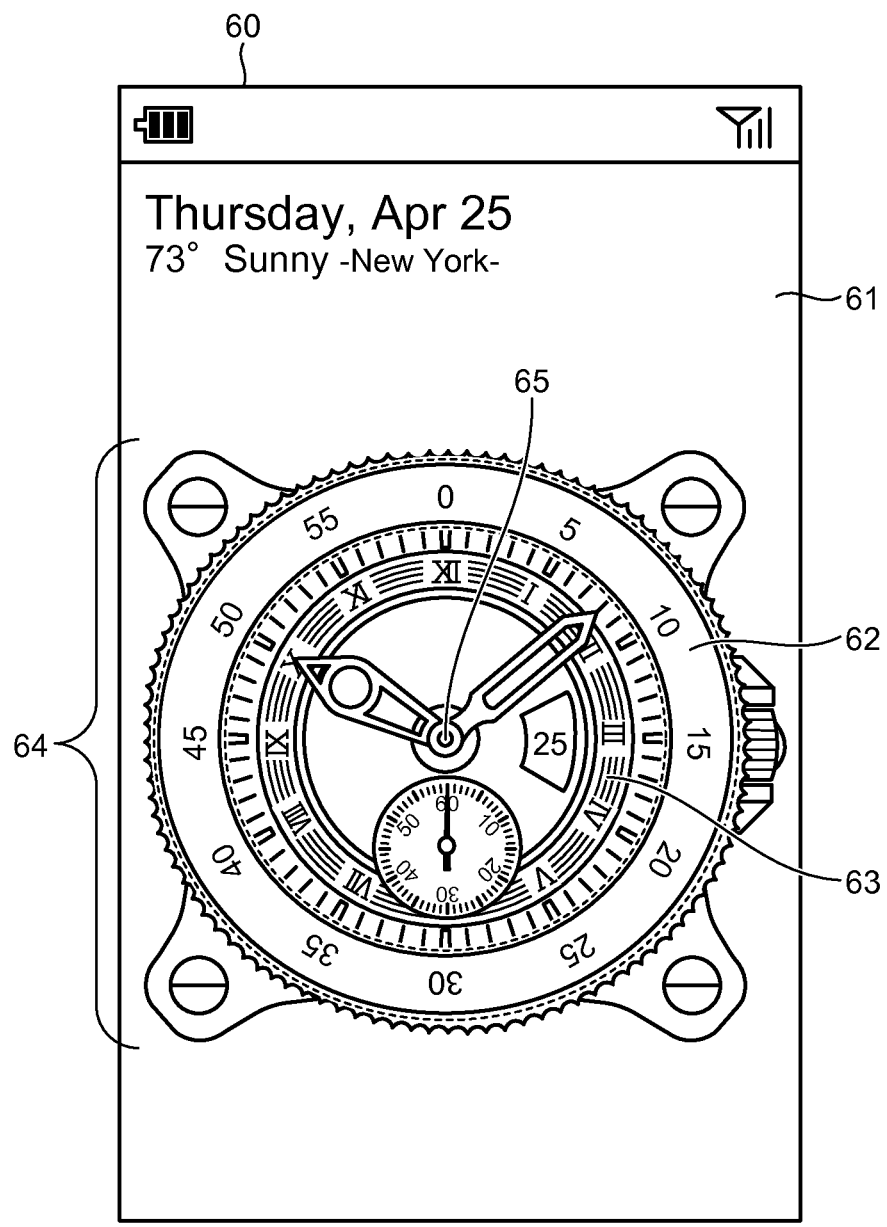
FIG. 6 is a view illustrating an example of a lock screen.

FIG. 6 illustrates an example of the lock screen. A lock screen 60 illustrated in FIG. 6 is the screen which is first displayed on the display 2A upon returning from the blackout state under the locked state, for example. As illustrated in FIG. 6, a wall paper 61 having the day of the week and the date thereon and a clock object 64 including a bezel 62 and a clock part 63 are displayed on the lock screen 60. The bezel 62 is an object configured to be moved by the user operation. While the clock part 63 is a fixed object that does not move, it ticks away the time by a long hand and a short hand connected at a center 65. Hereafter, the lock screen 60 illustrated in FIG. 6 is referred to as the initial state lock screen 60.

Figure 7:
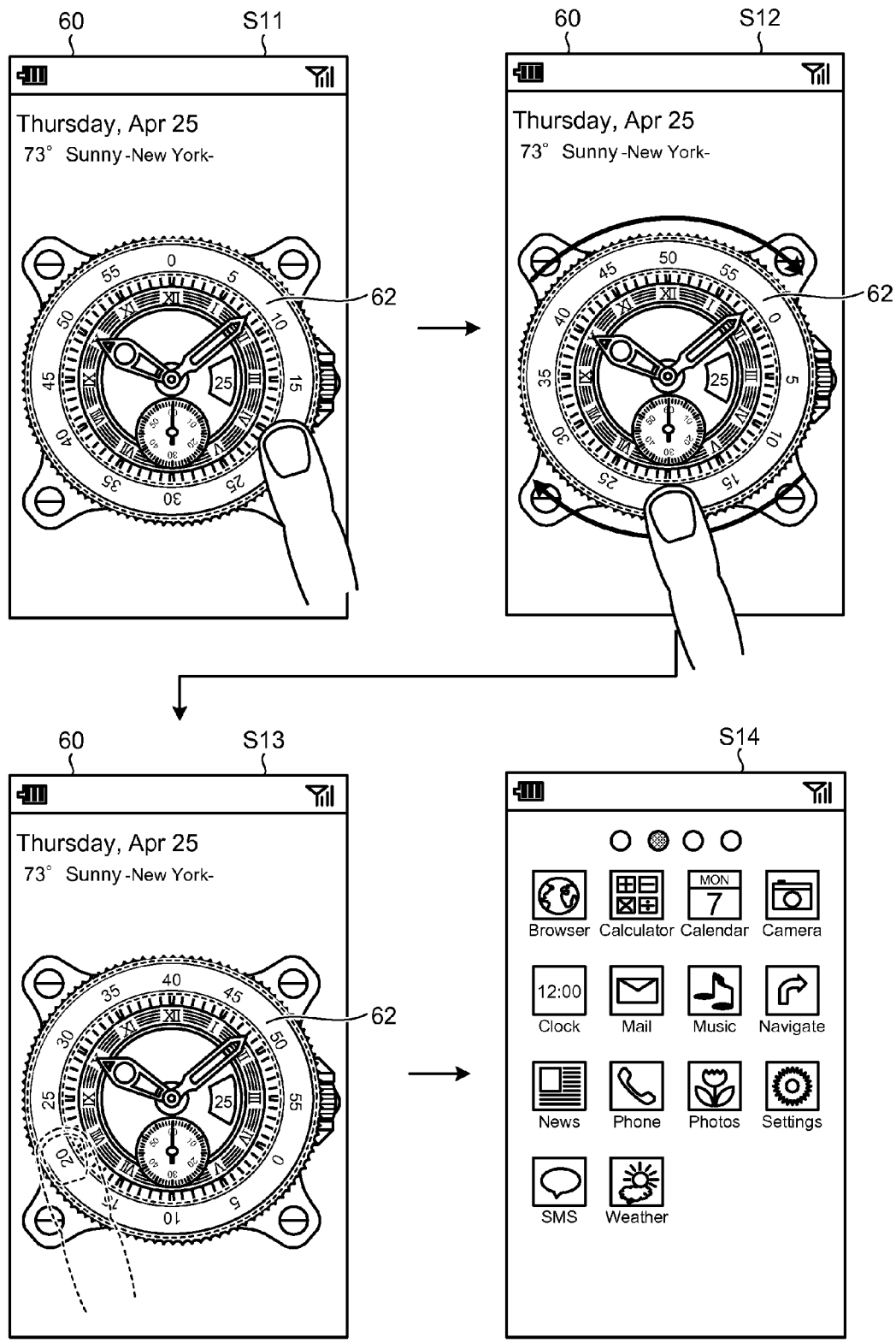
FIG. 7 is a view illustrating an example of control in response to a user operation to a clock object displayed on the lock screen.

FIG. 7 is a view illustrating an example of the control according to the user operation made to the clock object displayed on the lock screen. FIG. 7 illustrates the example of the control executed by the smartphone 1 when a series of touch gestures including a touch to the bezel 62 included in the clock object 64, a swipe around the clock, and a release from the bezel are sequentially detected through the touch screen 2B.

As illustrated in Step S11, in response that a touch is made by the user's finger, the smartphone 1 obtains the detection result of the touch screen 2B to identify the position at which the touch to the bezel 62 has been detected. For example, when the position of the bezel 62 at which the number "20" is described in the bezel 62 is touched by the user's finger, the smartphone 1 identifies the position at which the number "20" is described in the bezel 62 as the position at which the touch has been detected.

Subsequently, as illustrated in Step S12, in response that a swipe on the bezel 62 is made by the user's finger, the smartphone 1 obtains the detection result of the touch screen 2B and rotates the bezel 62 so as to follow the movement of the finger according to the obtained detection result. For example, as illustrated in Step S12, when a swipe is made on the bezel 62 clockwise by the user's finger, the smartphone 1 rotates the bezel 62 clockwise while keeping the position at which the bezel 62 is displayed in the lock screen 60. Until a release of the user's finger from the bezel 62 is detected, the smartphone 1 continues the process for obtaining the detection result of the touch screen 2B and rotating the bezel 62 according to the obtained detection result.

Subsequently, as illustrated in Step S13, in response that the release of the user's finger is detected, the smartphone 1 obtains the detection result of the touch screen 2B and identifies the position at which the release from the bezel 62 has been detected. For example, in Step S13, the smartphone 1 identifies the position on the bezel 62 at which the number "20" is described as the position at which the release occurred. The position of the bezel 62 at which the number "20" is described after the bezel 62 has been rotated by the swipe corresponds to the position of the bezel 62 at which the number "40" is described in the lock screen 60 before the bezel 62 has been rotated.

Subsequently, the smartphone 1 determines whether or not the position at which the touch to the bezel 62 has been detected and the direction of the bezel 62 satisfy the unlock condition stored in the storage 9 and, if the unlock condition is satisfied, the smartphone 1 cancels the locked state. The smartphone 1 stores, as the unlock condition, a combination of one of the numbers described in the bezel 62 and the direction of the bezel 62. Examples of the unlock condition include, but is not limited to, one of the numbers described in the bezel 62 and the direction of the bezel 62. The number that is one piece of the unlock condition is for verifying, out of the numbers described in the bezel 62, the number corresponding to the position at which the touch to the bezel 62 has been detected. The direction of the bezel 62 that is another piece of the unlock condition is for verifying the direction of the bezel 62 that has been rotated in response to the user operation. An example of the unlock condition will be described below. The smartphone 1 sets the number "20" described in the bezel 62 as the number that is one part of the unlock condition. Further, the smartphone 1 sets the direction of the bezel 62 which has been rotated clockwise by 120 degrees from the direction of the bezel 62 in the initial state lock screen 60 illustrated in FIG. 6. The smartphone 1 stores the combination of the number of the bezel 62 and the direction of the bezel 62 in the storage 9 as the unlock condition. The smartphone 1 may use the positions at which touch to and the release from the bezel 62 have been detected to identify the direction of the bezel 62 which has been rotated. For example, the smartphone 1 calculates the rotation direction of the bezel, and the angle made by three points of the positions at which the touch to and the release from the bezel 62 have been detected and the center 65, and identifies the direction of the bezel 62 based on the position at which the touch has been detected and the calculated angle. Then, as illustrated in the example of Step S11 to Step S13, if the position at which the touch to the bezel 62 has been detected and the direction of the bezel 62 satisfies the unlock condition stored in the storage 9, the smartphone 1 cancels the locked state.

Subsequently, after cancelling the locked state, the smartphone 1 displays the home screen 40 on the display 2A as illustrated in Step 14.

As described above, the operation of matching the touch position to the bezel 62 and the direction of the bezel 62 to the unlock condition is required in order to cancel the locked state, so that the locked state cannot be easily cancelled and thus the security capability of the lock screen can be improved.

Although the example has been described in which the smartphone 1 stores the combination of one of the numbers described in the bezel 62 and the direction of the bezel 62 as the unlock condition, the unlock condition is not limited thereto. As the unlock condition, the smartphone 1 may store in the storage 9 two numbers selected by the user out of the numbers described in the bezel 62 in the initial state lock screen 60. In the example illustrated in FIG. 7, the smartphone 1 stores the numbers "20" and "40" of the bezel 62 as the unlock condition. In this case, the smartphone 1 uses, as the unlock condition, the direction of the bezel 62 when the position of the bezel 62 at which the number "20" is described is rotated to the position of the bezel 62 at which the number "40" is described in the initial state lock screen 60.

After the detection of the release, the smartphone 1 may return the direction of the bezel 62 to the direction of the initial state lock screen 60 depending on the operation of the button 3 or the touch gesture by the user.

In the case illustrated in FIG. 7, although the smartphone 1 determines whether or not to cancel the locked state based on the position at which the touch to the bezel 62 has been detected and the direction of the bezel 62, the determination is not limited thereto. For example, the smartphone 1 may determines whether or not to cancel the locked state based only on the direction of the bezel 62. For example, when the triangular object configured to be rotated on the lock screen 62 is used, the position occupied by the object is not always the same in the lock screen 60 unlike the case in which the bezel 62 of the clock object 64 is used. By determining whether or not to cancel the locked state based only on the direction of the bezel 62, the smartphone 1 is able to determine the unlock by the same control as in the example in which the bezel 62 is used even if the position occupied by the object is not always the same.

Figure 8:
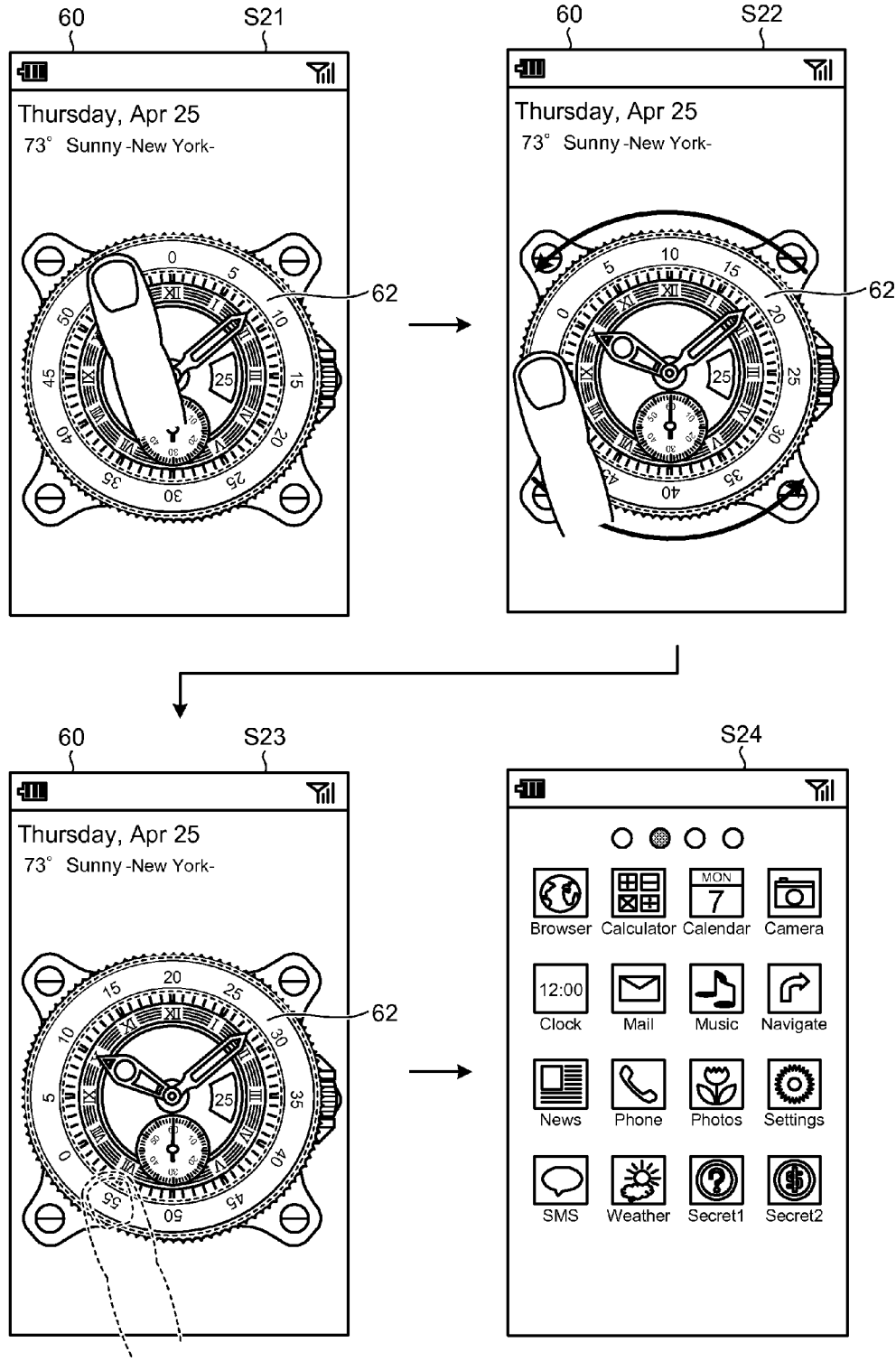
FIG. 8 is a view illustrating another example of control in response to a user operation to the clock object displayed on the lock screen.

FIG. 8 illustrates another example of the control depending on the user operation to the clock object displayed on the lock screen. FIG. 8 illustrates the example of the control executed by the smartphone 1 when a series of touch gestures including a touch to the bezel 62 included in the clock object 64, an anticlockwise swipe, and a release from the bezel 62 are sequentially detected through the touch screen 2B.

As illustrated in Step S21, in response to that a touch is made by the user's finger, the smartphone 1 obtains the detection result of the touch screen 2B to identify the position at which the touch has been detected. For example, when the position at which the number "55" is described in the bezel 62 is touched by the user's finger, the smartphone 1 identifies the position at which the number "55" is described in the bezel 62 as the position at which the touch has been detected.

Subsequently, as illustrated in Step S22, in response that a swipe is made by the user's finger, the smartphone 1 obtains the detection result of the touch screen 2B and rotates the bezel 62 so as to follow the movement of the finger according to the obtained detection result. For example, as illustrated in Step S22, when an anticlockwise swipe is made on the bezel 62 by the user's finger, the smartphone 1 rotates the bezel 62 anticlockwise while keeping the position at which the bezel 62 is displayed in the lock screen 60. The smartphone 1 continues to obtain the detection result of the touch screen 2B and make the operation to rotate the bezel 62 according to the obtained detection result until a release from the bezel 62 by the user's finger is detected.

Subsequently, as illustrated in Step S23, in response that the release by the user's finger is detected, the smartphone 1 obtains the detection result of the touch screen 2B to identify the position at which the release has been detected. For example, in Step S23, the smartphone 1 identifies the position at which the number "55" is described in the bezel 62 as the position at which the release has been made. The position at which the number "55" of the bezel 62 is described after the bezel 62 has been rotated by the swipe corresponds to the position at which the number "35" of the bezel 62 is described in the initial state lock screen 60.

Subsequently, the smartphone 1 determines whether or not the position at which the touch to the bezel 62 has been detected and the direction of the bezel 62 satisfy the unlock condition stored in the storage 9 and, if the unlock condition is satisfied, cancels the locked state. An example of the unlock condition will be described below. The smartphone 1 sets the number "55" described in the bezel 62 as the number that is one piece of the unlock condition. Further, the smartphone 1 sets the direction of the bezel 62 which has been rotated anticlockwise by 120 degrees from the direction of the bezel 62 of the initial state lock screen 60 illustrated in FIG. 6 as the direction that is another piece of the unlock condition. The smartphone 1 stores the combination of the number of the bezel 62 and the direction of the bezel 62 in the storage 9 as the unlock condition. Based on the position at which the touch to the bezel 62 has been detected and the position at which the release from the bezel 62 has been detected, the smartphone 1 may identify the direction of the bezel 62 which has been rotated. For example, the smartphone 1 calculates the rotation direction of the bezel, and the angle made by three points of the positions at which the touch to and the release from the bezel 62 have been detected and the center 65, and identifies the direction of the bezel 62 based on the position at which the touch has been detected and the calculated angle. Then, as the example illustrated in Step S21 to Step S23 of FIG. 8, if the position at which the touch to the bezel 62 has been detected and the direction of the bezel 62 satisfy the unlock condition stored in the storage 9, the smartphone 1 cancels the locked state.

Subsequently, after cancelling the locked state, the smartphone 1 displays the home screen for secret use on the display 2A as illustrated in Step S24. In the home screen for secret use illustrated in Step S24, icons (for example, Secret 1 and Secret 2) which are not displayed in the usual home screen displayed in Step S14 of FIG. 7 are displayed.

As described above, the operation of matching the touch position to the bezel 62 and the direction of the bezel 62 to the unlock condition is required in order to cancel the locked state, so that the locked state cannot be easily cancelled and thus the security capability of the lock screen can be improved. Further, as illustrated in FIG. 7 and FIG. 8, the home screen to be displayed on the display 2A after the locked state is cancelled can be changed depending on the rotation direction of the bezel. Thereby, the user friendly lock screen can be realized.

The home screen for secret use illustrated in FIG. 8 is one of the examples, and therefore other screens different in design such as the alignment of the icons 50 than the home screen for the secret use in FIG. 8 may be displayed as the home screen for the secret use.

Although the control of cancelling the locked state by rotating the bezel 62 by the swipe has been described in FIG. 7 and FIG. 8, the bezel 62 may be controlled to be rotated by the different operation from the swipe. For example, when two points of single taps are made to the numbers of the bezel 62, the smartphone 1 controls the bezel to be rotated clockwise such that the position of the first tapped number is displayed at the position of the subsequently tapped number. Alternatively, when two points of double taps are made to the numbers of the bezel 62, the smartphone 1 controls the bezel to be rotated anticlockwise such that the position of the first tapped number is displayed at the position of the subsequently tapped number.

In FIG. 7 and FIG. 8, the coordinate values of the lock screen 60 corresponding to respective positions at which the touch and the release are made by the user may be obtained as the detection result of the touch screen 2B. In this case, the smartphone 1 pre-stores the combination of the coordinate value(s) and the direction of the bezel in the storage 9 as the unlock condition.

Although the case has been described in FIG. 7 and FIG. 8 that the determination of the lock cancellation is made based on the position at which the touch position to the bezel 62 and the direction of the bezel 62 by using the clock object 64 having the bezel 62 that rotates following the swipe by the user, the embodiment is not limited thereto. For example, the smartphone 1 may employ an object in which the bezel 62 does not rotate following the swipe by the user. In this case, the smartphone 1 pre-stores the combination of the two numbers described in the bezel 62 in the storage 9 as the unlock condition. Then, in response that a series of touch gestures including a touch, a swipe, and a release on the bezel 62 are detected, the smartphone 1 identifies the numbers corresponding to the positions at which the touch to and the release from the bezel 62 have been detected. If the combination of the two identified numbers matches the combination of the numbers stored as the unlock condition, the smartphone 1 cancels the locked state. The smartphone 1 may take into consideration whether the swipe direction is clockwise or anticlockwise.

When the bezel 62 is an object that does not rotate following the swipe by the user, the smartphone 1 may pre-store the angle made by three points of the positions of the two numbers described in the bezel 62 and the center 65 of the clock object 64 in the storage 9 as the unlock condition. In this case, in response that a series of touch gestures including a touch, a swipe, and a release on the bezel 62 are detected, the smartphone 1 identifies the numbers corresponding to the positions at which the touch to and the release from the bezel 62 have been detected and calculates the angle made by the positions of these two numbers and the center 65. Then, if the calculated angle matches the angle stored as the unlock condition, the smartphone 1 cancels the locked state.

When the bezel 62 is an object that does not rotate following the swipe by the user, the smartphone 1 may change the home screen to be displayed on the display 2A after the lock is cancelled, in taking the swipe direction into account. For example, a series of touch gestures including a touch, a swipe, and a release on the bezel 62 are detected, the smartphone 1 may identify the swipe direction from the position at which the touch and the release have been detected. When the touch has been detected at the position of the bezel 62 at which the number "20" is described and the release has been detected at the position of the bezel 62 at which the number "40" is described, the swipe direction may be identified as clockwise.

Although the case where the clock object is displayed has been described in FIG. 6, FIG. 7, and FIG. 8 as an example of the lock screen, this is a mere example. The control in FIG. 7 and FIG. 8 as described above may be similarly applied to other objects than the clock that are suitable to the operation of rotation movement.

Figure 9:
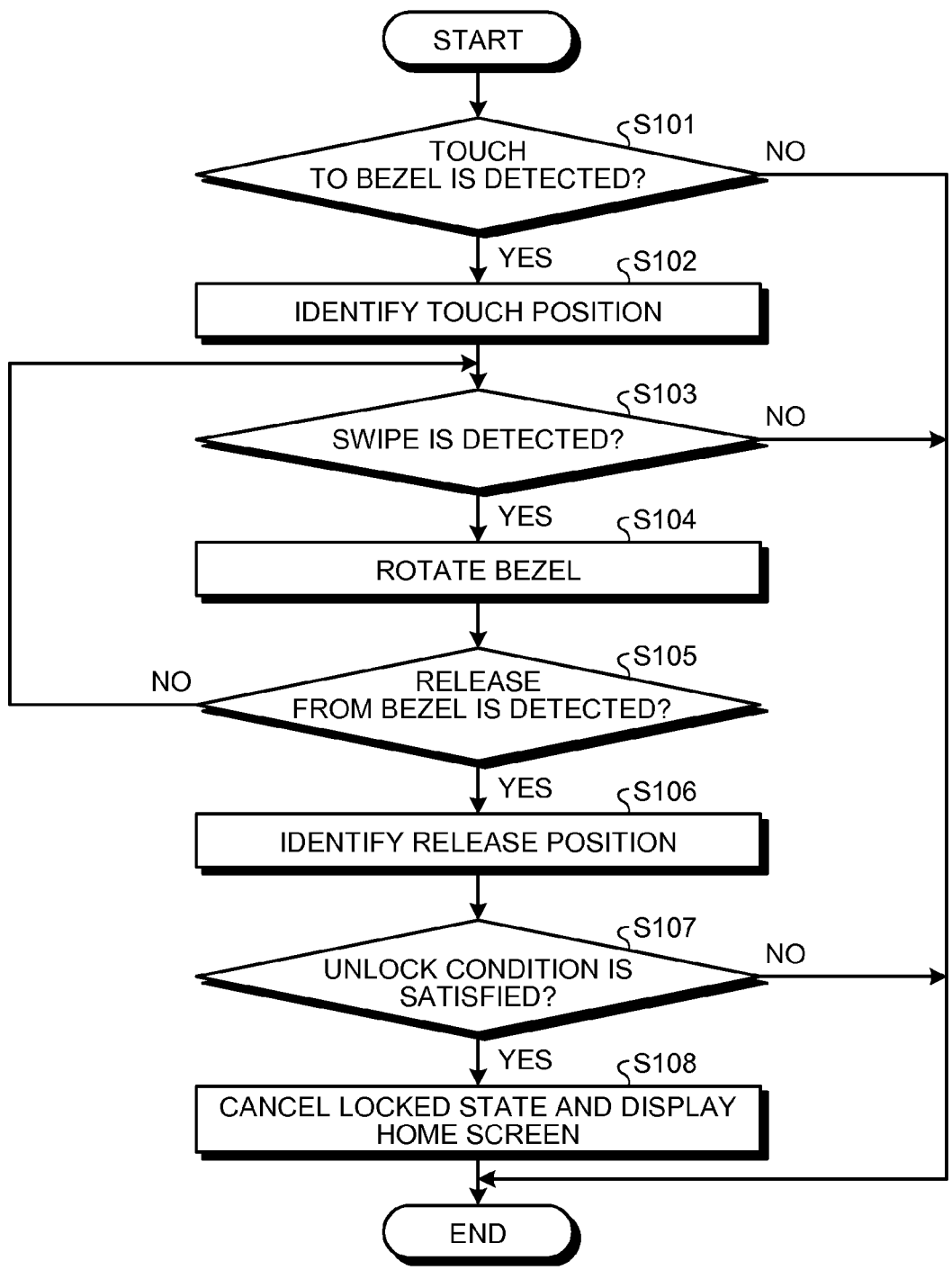
FIG. 9 is a view illustrating a procedure for cancelling a locked state to display a usual home screen.
Figure 11:
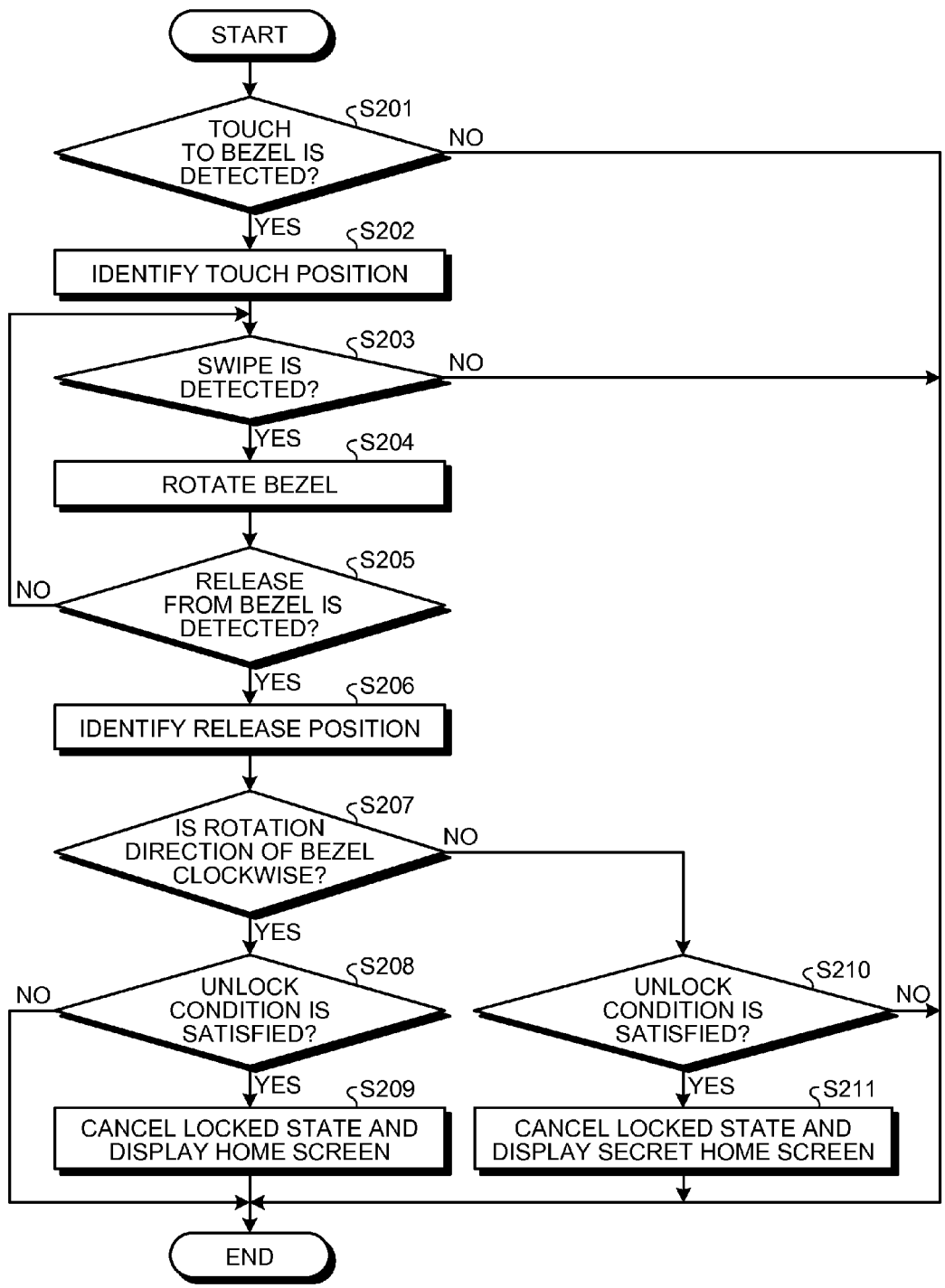
FIG. 11 is a view illustrating a procedure for cancelling the locked state to display a home screen for secret use.

By referring to FIG. 9 to FIG. 12, described will be examples of the procedure of the control based on the functions provided by the control program 9A. FIG. 9 illustrates a procedure for cancelling the locked state to display the usual home screen. FIG. 10 illustrates an example of the setting screen of the unlock condition utilized in the procedure in FIG. 9. FIG. 11 illustrates a procedure for cancelling the locked state to display the home screen for secret use. FIG. 12 illustrates an example of the setting screen of the unlock condition utilized in the procedure illustrated in FIG. 11.

The procedure illustrated in FIG. 9 or FIG. 11 is implemented by causing the controller 10 to execute the control program 9A. The procedure illustrated in FIG. 9 or FIG. 11 is repeatedly executed during the lock screen 60 being displayed on the display 2A. The controller 10 may execute another procedure for the control on the smartphone 1 in parallel to the procedure illustrated in FIG. 9 or FIG. 11.

First, the procedure illustrated in FIG. 9 will be described. At Step S101, the controller 10 executes the determination for the detection of a touch to the bezel 62 displayed on the lock screen 60. When no touch to the bezel 62 has been detected (No at Step S101), the controller 10 just finishes the process. When a touch to the bezel 62 is detected (Yes at Step S101), then at Step S102, the controller 10 identifies the touch position from the detection result of the touch screen 2B.

Subsequently, at Step S103, the controller 10 executes the determination for the detection of a swipe. When a swipe is detected (Yes at Step S103), then at Step S104, the controller 10 rotates the bezel 62 according to the detection result of the touch screen 2B while keeping the display position of the bezel 62 in the lock screen 60.

Subsequently, at Step S105, the controller 10 executes the determination for the detection of a release from the bezel 62. When no release has been detected (No at Step S105), the controller 10 returns to the above-described Step S103. That is, until the release from the bezel 62 is detected, the controller 10 continues the process for rotating the bezel 62 according to the detection result of the touch screen 2B. In contrast, when a release is detected (Yes at Step S105), then at Step S106, the controller 10 identifies the release position from the detection result of the touch screen 2B.

Subsequently, at Step S107, the controller 10 executes the determination process as to whether or not the unlock condition is satisfied based on the touch position identified at Step S102 and the release position identified at Step S106. For example, by using the positions at which the touch to and the release from the bezel 62 have been detected, the smartphone 1 identifies the direction of the bezel 62 that has been rotated and determines whether or not the position at which the touch to the bezel 62 has been detected and the direction of the bezel 62 satisfy the unlock condition.

The smartphone 1 may pre-store, for example, the combination of the numbers of the bezel 62 as the unlock condition. As illustrated in FIG. 10, the smartphone 1 instructs the user to select, on the setting screen of the unlock condition, the number "20" of the bezel 62 corresponding to the touch position and the number "40" of the bezel 62 corresponding to the release position and stores the combination of these numbers in the storage 9 as the unlock condition. In this case, the controller 10 uses, as the unlock condition, the direction of the bezel 62 when the position at which the number "20" is described in the bezel 62 is rotated to the position at which the number "40" of the bezel 62 is described in the initial state lock screen 60.

In the smartphone 1, when the result of the determination satisfies the unlock condition (Yes at Step S107), then at Step S108, the controller 10 cancels the locked state to display the home screen 40 illustrated in FIG. 4 and finishes the process. On the other hand, when the unlock condition is not satisfied (No at Step S107), the controller 10 does not cancel the locked state and just finishes the process.

At Step S103, when no swipe has been detected (No at Step S103), the controller 10 just finishes the process. In Step S103, the controller 10 may wait until a swipe is detected, or may wait for a predetermined time period before a swipe is detected.

Next, the procedure illustrated in FIG. 11 will be described. At Step S201, the controller 10 executes the determination for the detection of a touch to the bezel 62 displayed on the lock screen 60. When no touch to the bezel 62 has been detected (No at Step S201), the controller 10 just finishes the process. When a touch to the bezel 62 is detected (Yes at Step S201), then at Step S202, the controller 10 identifies the touch position from the detection result of the touch screen 2B.

Subsequently, at Step S203, the controller 10 executes the determination for the detection of a swipe. When a swipe is detected (Yes at Step S203), then at Step S204, the controller 10 rotates the bezel 62 according to the detection result of the touch screen 2B while keeping the display position of the bezel 62 in the lock screen 60.

Subsequently, at Step S205, the controller 10 executes the determination for the detection of a release from the bezel 62. When no release has been detected (No at Step S205), the controller 10 returns to the above-described Step S203. That is, until the release from the bezel 62 is detected, the controller 10 continues the process for rotating the bezel 62 according to the detection result of the touch screen 2B. In contrast, when a release is detected (Yes at Step S205), then at Step S206, the controller 10 identifies the release position from the detection result of the touch screen 2B.

Subsequently, at Step S207, the controller 10 executes the determination process as to whether the rotation direction of the bezel 62 is clockwise or not. For example, the controller 10 may also calculate the rotation direction of the bezel 62 in rotating the bezel 62 at Step S204, or may determine the rotation direction of the bezel 62 by calculating the trace during the swipe from the detection result of the touch screen 2B.

When the rotation direction of the bezel 62 is clockwise (Yes at Step S207), then at Step S208, the controller 10 executes the determination process as to whether or not the unlock condition is satisfied based on the touch position identified at Step S202 and the release position identified at Step S206. For example, the controller 10 uses the positions at which the touch to and the release from the bezel 62 have been detected to identify the direction of the bezel 62 that has been rotated, and determines whether or not the position at which the touch to the bezel 62 has been detected and the direction of the bezel 62 satisfy the unlock condition.

The smartphone 1 may pre-store, for example, the combination of the rotation direction of the bezel 62 and the numbers of the bezel 62 as the unlock condition. As illustrated in FIG. 12, the smartphone 1 instructs the user to select the rotation direction of the bezel and the numbers of the bezel 62 corresponding to the touch position and the release position, respectively, on the setting screen of the unlock condition and stores the combination of the rotation direction and the numbers in the storage 9 as the unlock condition. In this case, the controller 10 uses, as the unlock condition, the direction of the bezel 62 when the position at which the number "20" is described in the bezel 62 is rotated clockwise to the position at which the number "40" of the bezel 62 is described in the initial state lock screen 60.

When the result of the determination satisfies the unlock condition (Yes at Step S208), then at Step S209, the controller 10 cancels the locked state to display the home screen 40 as illustrated in FIG. 4, for example, and finishes the process. In contrast, when the unlock condition is not satisfied (No at Step S208), the controller 10 does not cancel the locked state and just finishes the process.

On the other hand, the rotation direction of the bezel 62 is anticlockwise (No at Step S207), then at Step S210, the controller 10 executes the determination process as to whether or not the secret unlock condition is satisfied based on the touch position identified at Step S202 and the release position identified at Step S206.

The smartphone 1 may pre-store the combination of the rotation direction of the bezel 62 and the numbers of the bezel 62, for example, as a secret unlock condition. As illustrated in FIG. 12, the smartphone 1 instructs the user to select the rotation direction of the bezel and the numbers of the bezel 62 corresponding to the touch position and the release position, respectively, on the setting screen of the unlock condition and stores the combination of the rotation direction and the numbers in the storage 9 as the secret unlock condition. In this case, the controller 10 uses, as the secret unlock condition, the direction of the bezel 62 when the position at which the number "55" is described in the bezel 62 is rotated anticlockwise to the position at which the number "35" of the bezel 62 is described in the initial state lock screen 60.

When the result of the determination satisfies the secret unlock condition (Yes at Step S210), then at Step S211, the controller 10 cancels the locked state to display the home screen for secret use illustrated in FIG. 8 and finishes the process. In contrast, when the secret unlock condition is not satisfied (No at Step S210), the controller 10 does not cancel the locked state and just finishes the process.

At Step S203, when no swipe has been detected (No at Step S203), the controller 10 just finishes the process. In Step S203, the controller 10 may wait until a swipe is detected, or may wait for a predetermined time period before a swipe is detected.

Each of the unlock condition illustrated in FIG. 10 and the secret unlock condition illustrated in FIG. 12 is a mere example, and thus the condition including the combination of the rotation direction of the bezel 62 and the numbers of the bezel 62 may be properly changed in use. In the case that the combination of the numbers of the bezel 62 is utilized, 144 combinations will be possible, so that a person other than the user is unable to easily cancel the lock screen. In such a way, the use of combination of the numbers as the unlock condition allows for improved security capability of the lock screen. Further, when the lock screen is cancelled, the user can select either the usual home screen 40 as illustrated in FIG. 4 or the home screen for secret use as illustrated in FIG. 8, only by changing the rotation direction of the bezel 62, so that the user friendly lock screen can be realized.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

Figure 13:
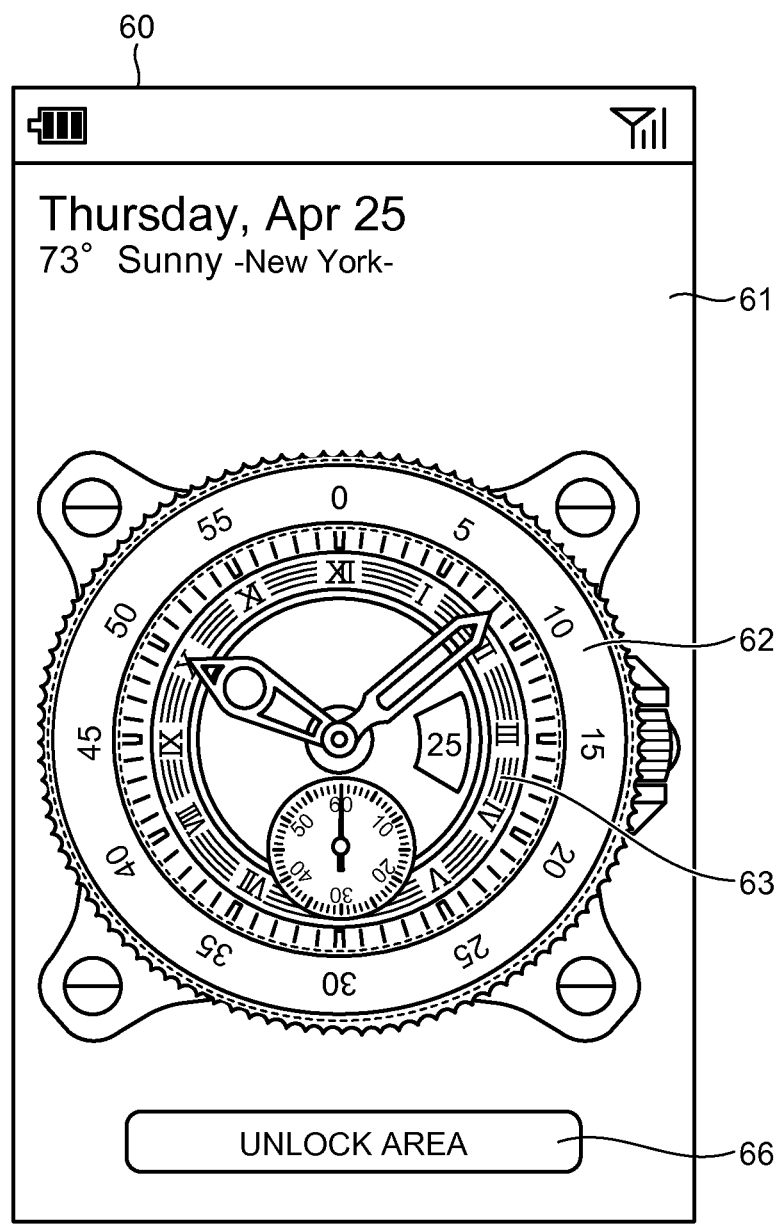
FIG. 13 is a view illustrating an example of a lock screen having an unlock area.

FIG. 13 illustrates an example of the lock screen having an unlock area. As illustrated in FIG. 13, an unlock area 66 that is able to accept, as the unlock operation, a predetermined user operation such as a tap or a swipe that can be detected through the touch screen 2B may be provided on the lock screen 60 separately from the object of the bezel 62. Then, according to whether the unlock operation is accepted through the bezel 62 or the unlock area 66, the smartphone 1 changes the home screen to be displayed after the cancellation of the locked state. For example, the smartphone 1 may display the home screen 40 illustrated in FIG. 4 when it accepts the unlock operation through the unlock area 66, while the smartphone 1 may display the home screen for secret use illustrated in FIG. 8 when it accepts the unlock operation through the bezel 62.

Figure 14:
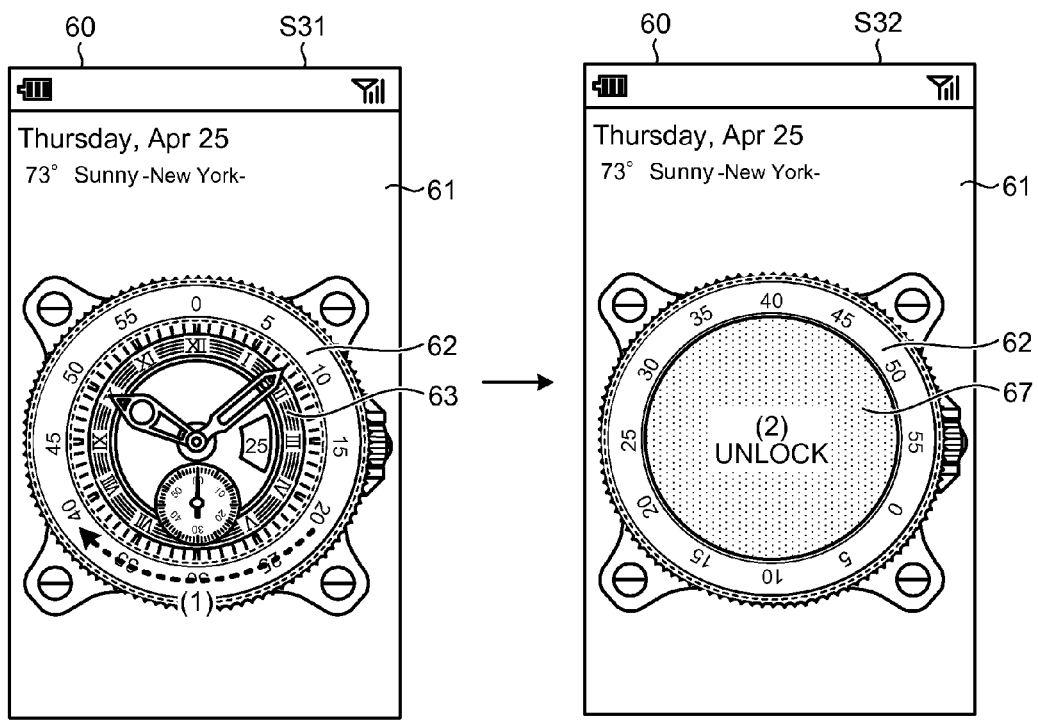
FIG. 14 is a view illustrating an example of a stepwise unlock operation.

FIG. 14 illustrates an example of a stepwise unlock operation. In the above-described embodiment, although the case that the lock screen 60 is cancelled by the rotational operation of the bezel 62 has been described, the unlock operation is not limited thereto. For example, as illustrated in FIG. 14, the locked state may be cancelled by making a rotational operation of the bezel 62 and then making an operation on an unlock button.

As illustrated in Step S31 of FIG. 14, when the clockwise operation (1) to the bezel 62 is detected, the smartphone 1 rotates the bezel 62 clockwise while keeping the position at which the bezel 62 is displayed. Subsequently, as illustrated in Step S32 of FIG. 14, the smartphone 1 displays an image 67 of the unlock button at the region that has been the clock area 63. The timing of displaying the image 67 of the unlock button may be set to any timing such as the same time as the rotation of the bezel 62, the time at which the release from the bezel 62 is detected, and so on.

Then, in response that the operation (2) to the image 67 of the unlock operation button is detected, the smartphone 1 cancels the lock screen 60. Any operations such as a tap operation, a double-tap operation, and so on may be set for the operation (2) to the image 67 of the unlock operation button.

In the embodiment, the smartphone has been explained as an example of the device provided with the touch screen; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a touch screen display configured to display a first screen, the first screen being a lock screen including (i) an unlock area to accept an unlock operation and (ii) an object arranged on the first screen, the object including a movable part and an unmovable part; and
a controller configured to change a direction of the object by rotating the movable part about a stationary axis according to an operation to the object, while keeping a display position of the object,
wherein
the controller is configured to
when the unlock operation is accepted through the unlock area, turn the first screen to a second screen that is a first home screen other than the lock screen, and
when the direction of the object changed by rotating the movable part satisfies a predetermined condition, turn the first screen to a third screen that is a second home screen other than the lock screen and the second screen,
wherein the third screen comprises one or more icons that are displayed in the second screen and one or more additional icons that are hidden from view in the second screen,
wherein the movable part has a plurality of indicia which move in response to the operation to the object.

2. The device according to claim 1, wherein the controller is configured to turn the first screen to the third screen when a position of the operation to the object and the direction of the object at an end of the operation satisfy the predetermined condition.

3. A method of controlling a device including a touch screen display, the method comprising:
displaying on the touch screen display a first screen, the first screen being a lock screen including (i) an unlock area to accept an unlock operation and (ii) an object arranged on the first screen, the object including a movable part and an unmovable part;
changing a direction of the object by rotating the movable part about a stationary axis according to an operation to the object, while keeping a display position of the object;

when the unlock operation is accepted through the unlock area, turning the first screen to a second screen that is a first home screen other than the lock screen; and when the direction of the object changed by rotating the movable part satisfies a predetermined condition, turning the first screen to a third screen that is a second home screen other than the lock screen and the second screen, wherein the third screen comprises one or more icons that are displayed in the second screen and one or more additional icons that are hidden from view in the second screen, and wherein the movable part has a plurality of indicia which move in response to the operation to the object.

4. A non-transitory storage medium that stores a program for causing, when executed by a device comprising a touch screen display, the device to execute:

displaying on the touch screen display a first screen, the first screen being a lock screen including (i) an unlock area to accept an unlock operation and (ii) an object arranged on the first screen, the object including a movable part and an unmovable part;

changing a direction of the object by rotating the movable part about a stationary axis according to an operation to the object, while keeping a display position of the object;

when the unlock operation is accepted through the unlock area, turning the first screen to a second screen that is a first home screen other than the lock screen; and when the direction of the object changed by rotating the movable part satisfies a predetermined condition, turning the first screen to a third screen that is a second home screen other than the lock screen and the second screen, wherein the third screen comprises one or more icons that are displayed in the second screen and one or more additional icons that are hidden from view in the second screen, wherein the movable part has a plurality of indicia which move in response to the operation to the object.

5. The electronic device according to claim 1, wherein the controller is configured to identify a touch position of the object where the operation starts, rotate the movable part in accordance with the operation, while keeping the display position of the object, identify a release position of the object where the operation ends, and turn the first screen to the third screen when the identified touch position and release position satisfy the predetermined condition.

6. The method according to claim 3, wherein the first screen is turned to the third screen when a position of the operation to the object and the direction of the object at an end of the operation satisfy the predetermined condition.

7. The method according to claim 3, further comprising identifying a touch position of the object where the operation starts, rotating the movable part in accordance with the operation, while keeping the display position of the object, and identifying a release position of the object where the operation ends, and turning the first screen to the third screen when the identified touch position and release position satisfy the predetermined condition.

8. The non-transitory storage medium according to claim 4, wherein the program, when executed by the device, further causes the device to execute turning the first screen to the third screen when a position of the operation to the object and the direction of the object at an end of the operation satisfy the predetermined condition.

9. The non-transitory storage medium according to claim 4, wherein the program, when executed by the device, further causes the device to execute identifying a touch position of the object where the operation starts, rotating the movable part in accordance with the operation, while keeping the display position of the object, and identifying a release position of the object where the operation ends, and turning the first screen to the third screen when the identified touch position and release position satisfy the predetermined condition.

* * * * *